(12) United States Patent
Bedi et al.

(10) Patent No.: US 10,133,673 B2
(45) Date of Patent: Nov. 20, 2018

(54) CACHE OPTIMIZATION BASED ON PREDICTIVE ROUTING

(71) Applicant: Verizon Digital Media Services Inc., Playa Vista, CA (US)

(72) Inventors: Harkeerat Singh Bedi, Los Angeles, CA (US); Amir Reza Khakpour, Los Angeles, CA (US); Derek Shiell, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 29 days.

(21) Appl. No.: 15/065,524

(22) Filed: Mar. 9, 2016

(65) Prior Publication Data
US 2017/0262373 A1  Sep. 14, 2017

(51) Int. Cl.
*G06F 12/0868* (2016.01)
*G06F 12/0871* (2016.01)
*G06F 12/0873* (2016.01)

(52) U.S. Cl.
CPC ...... *G06F 12/0868* (2013.01); *G06F 12/0871* (2013.01); *G06F 12/0873* (2013.01);
(Continued)

(58) Field of Classification Search
CPC ............ G06F 12/0873; G06F 12/0871; G06F 12/0868
See application file for complete search history.

(56) References Cited

U.S. PATENT DOCUMENTS

| 4,503,501 A | * | 3/1985 | Coulson | ............ G06F 12/0866 |
|   |   |   |   | 711/129 |
| 5,717,893 A | * | 2/1998 | Mattson | ................ G06F 12/084 |
|   |   |   |   | 711/129 |

(Continued)

OTHER PUBLICATIONS

Tam et al, "An Adaptive Framework of Multiple Schemes for Event and Query Distribution in Wireless Sensor Networks," 2007 4th IEEE Consumer Communications and Networking Conference, Las Vegas, NV, USA, 2007, pp. 182-186. [retrieved from internet Oct. 4, 2017][<URL:http://ieeexplore.ieee.org/abstract/document/4199131/>].*

(Continued)

*Primary Examiner* — David Yi
*Assistant Examiner* — Nicholas A. Paperno
(74) *Attorney, Agent, or Firm* — Ansari Katiraei LLP; Arman Katiraei; Sadiq Ansari (57) ABSTRACT

The embodiments implement file size variance caching optimizations. The optimizations are based on a differentiated caching implementation involving a small size content optimized first cache and a large size content optimized second cache optimized. The first cache reads and writes data using a first block size. The second cache reads and writes data using a different second block size that is larger than the first block size. A request management server controls request distribution across the first and second caches. The request management server differentiates large size content requests from small size content requests. The request management server uses a first request distribution scheme to restrict large size content request distribution across the first cache and a second request distribution scheme to restrict small size content request distribution across the second cache.

17 Claims, 8 Drawing Sheets

(52) U.S. Cl.
CPC .............. *G06F 2212/1016* (2013.01); *G06F 2212/282* (2013.01); *G06F 2212/284* (2013.01); *G06F 2212/305* (2013.01); *G06F 2212/463* (2013.01)

(56) References Cited

U.S. PATENT DOCUMENTS

| | | | | |
|---|---|---|---|---|
| 7,111,057 B1* | 9/2006 | Sherman | ............ | G06F 17/3089 707/999.01 |
| 8,583,763 B1* | 11/2013 | Kim | ............ | G06F 21/53 709/218 |
| 2011/0289126 A1* | 11/2011 | Aikas | ............ | H04L 29/08729 707/827 |
| 2014/0019707 A1* | 1/2014 | Benhase | ............ | G06F 12/023 711/171 |
| 2014/0172944 A1* | 6/2014 | Newton | ............ | H04L 41/0893 709/202 |
| 2014/0195686 A1* | 7/2014 | Yeager | ............ | H04L 67/1023 709/226 |
| 2014/0222988 A1* | 8/2014 | Shlomo | ............ | H04L 67/1097 709/224 |
| 2015/0356196 A1* | 12/2015 | Sreenivas Prasad | ............ | G06F 17/30864 707/740 |

OTHER PUBLICATIONS

Chandak, Parts of a URL, Virendra's TechTalk, May 26, 2012 [retrieved from internet Oct. 5, 2017][<URL:https://www.virendrachandak.com/techtalk/parts-of-url/>].*

* cited by examiner

CACHE OPTIMIZATION BASED ON PREDICTIVE ROUTING

BACKGROUND ART

A caching server or proxy server is a machine operating within a network, such as the Internet, to retain copies of relevant content closer to users requesting the content. Typically, the caching server dynamically determines what content to cache by intercepting or otherwise receiving requests from the user. The caching server retrieves the content to be cached from one or more source servers that are located further away from the users serviced by the caching server. The caching server is able to accelerate delivery of the cached content to users because of its closer proximity to the users.

The amount of content that any caching server can locally cache is limited according to the server memory or disk. As the cache is filled, the caching server optimizes the cache to determine what content should remain in cache and what content should be replaced. The better the caching server is able to optimize its cache, the greater the percentage of requests it will be able to respond to directly from cache.

Content delivery networks (CDNs) deploy several such caching servers to different points-of-presence (PoPs). Each PoP accelerates content delivery to users in one or more geographic regions that are located closest to the PoP. The CDN scale allows it to cache terabytes of content at each of the regions, thereby providing accelerated content delivery for hundreds or thousands of content providers and content objects. However, this scale also amplifies the need for the CDN to optimize every aspect of caching. Any caching inefficiencies are multiplied across the entire CDN. For instance, a caching optimization that could provide one millisecond performance improvement will result in hours of improved performance across the CDN over time. Accordingly, there is need to optimize caching and improve caching performance.

BRIEF DESCRIPTION OF THE DRAWINGS

A preferred embodiment of methods and systems for optimized caching based on predictive routing will now be described, by way of example only, with reference to the accompanying drawings in which.

DETAILED DESCRIPTION

One of the barriers to cache optimization is the variance in the content being cached. One particular variance is the file size of the content being cached. Small size content includes content that is usually a few kilobytes or megabytes in size. Images, text, advertisements, and icons are examples of small size content. Large size content includes content that is several megabytes and even gigabytes in size. Videos, streaming content, applications, and games are examples of large size content. In some embodiments, large size content is content with file sizes exceeding a threshold and small size content is content with file sizes that does not exceed the threshold.

The file size variance degrades caching performance, because the storage medium that is used to cache both small and large size content cannot be optimized for caching both small and large sized content. Different optimizations are needed for efficiently reading and writing small sized content than for efficiently reading and writing large sized content. Accordingly, some embodiments provide a first small size content optimized cache for caching small sized content and a second large size content optimized cache for caching large sized content. In some embodiments, the storage medium on which the small size content optimized cache is implemented uses a different block size to read to and write from cache than the storage medium on which the large size content optimized cache is implemented. In some embodiments, the small size content optimized cache is implemented on solid state drives (SSDs), whereas the large size content optimized cache is implemented on mechanical hard drives. In some embodiments, the small size content optimized cache is implemented on the same type of storage medium as the large size content optimized cache.

The disk block size represents the unit used to read from and write to a storage medium or disk. A larger block size can improve performance for large sized content as larger content can be read from or written to disk with a fewer number of disk accesses. For example, a disk with a block size of 10 kilobytes (KBs) could read or write content in about half the number of disk accesses than a disk with a block size of 5 KBs. The tradeoff however is that some percentage of the blocks can go unused and therefore be wasted if the disk is also used for caching small content that is smaller in size than the configured block size. Moreover, the storage medium can lose performance when reading from or writing to blocks where only a portion of the block is used and a significant amount of the reading and writing involves small sized content that is smaller in size than the configured block size. For instance, the storage medium would read an entire 10 KB block even if only 2 KBs of the block are used.

Accordingly, the embodiments implement file size variance caching optimizations. As noted above, the optimizations are based on a differentiated caching implementation involving a first storage medium optimized for small size content caching and a different second storage medium optimized for large size content caching. The differentiated caching implementation further involves a predictive routing solution for accurately and selectively distributing requests between the differentiated storage media with little to no added delay in determining the optimized storage medium for the content being requested.

Figure 1:
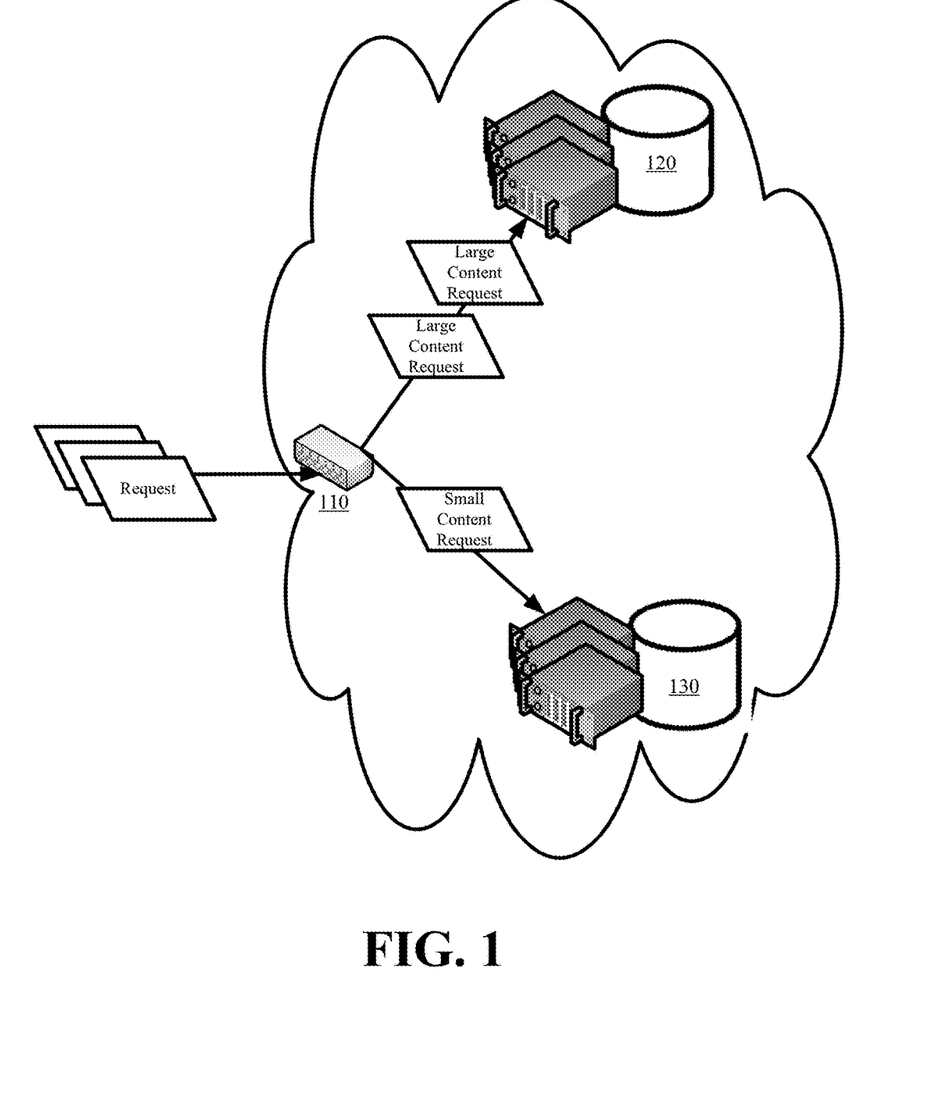
FIG. 1 depicts the machine infrastructure for implementing the file size variance caching optimizations of some embodiments.

FIG. 1 depicts the machine infrastructure for implementing the file size variance caching optimizations of some embodiments. The machine infrastructure comprises a front-end distributor 110, a first cache 120, and a second cache 130.

In some embodiments, the first cache 120 and the second cache 130 function as caching servers that can accept requests, retrieve requested content from the appropriate origin, store the retrieved content in cache according to a configured caching policy, and serve cached content in response to requests. In some embodiments, the first and second caches 120 and 130 are configured with one or more disks (e.g., magnetic, solid state, optical, or holographic), memory, or any other storage medium that can be used for content storage. The storage mediums of the first and second caches 120 and 130 are preferably separate drives, but in some embodiments, can be a single drive having at least two partitions, with each partition optimized for caching of different size content. As part of the file size variance caching optimizations, the first cache 120 is optimized for large size content caching and the second cache 130 is optimized for small size content caching.

The front-end distributor 110 selectively distributes large size content or requests for large size content to the first cache 120 and small size content or requests for small size content to the second cache 130. To do so, the front-end distributor 110 implements some web servers features that allow the front-end distributor 110 to parse headers of user issued requests as well as responses to head requests issued by the front-end distributor 110. Although the figure illustrates a front-end distributor 110 distributing requests across one first cache 120 and one second cache 130, the first cache 120 can represent two or more disks, drives, or other storage media that have been optimized for large size content caching while the second cache 130 can represent two or more disks, drives, or other storage media that have been optimized for small size content caching.

In some embodiments, the front-end distributor 110, the first cache 120, and the second cache 130 operate as part of a single physical machine or server. Such an implementation can be used when the machine performing the file size variance caching optimizations operates independently as a proxy or single caching server.

In some other embodiments, the front-end distributor 110 is a first machine that operates separate and independent from at least one second machine providing the first cache 120 and at least one third machine providing the second cache 130. As separate machines, the front-end distributor 110 can be a load balancing device in a content delivery network (CDN) point-of-presence (PoP) that is tasked with distributing content requests across at least the second and third machines operating as differently optimized caching servers within the PoP. In some such configurations, the at least one second machine represents one or more caching servers of the PoP that are optimized for large size content caching, while the at least one third machine represents one or more caching servers of the PoP that are optimized for small size content caching.

Figure 2:
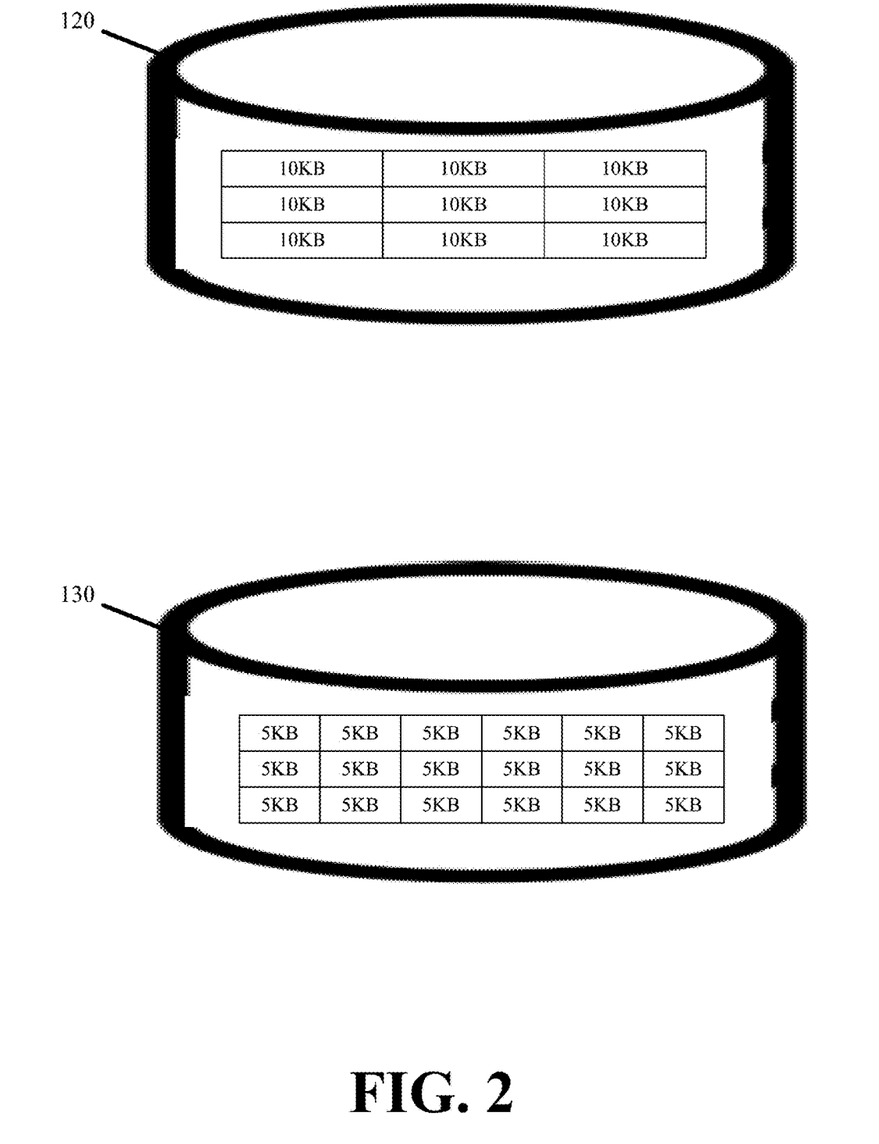
FIG. 2 conceptually illustrates optimizing the first cache for large size content caching and the second cache for small size content caching in accordance with some embodiments.

FIG. 2 conceptually illustrates optimizing the first cache 120 for large size content caching and the second cache 130 for small size content caching in accordance with some embodiments. The optimizations stem from configuring the storage medium of each cache differently. In particular, the large size content optimized first cache 120 is a storage medium with block or sector sizes that are larger than the block or sector sizes for the storage medium of the small size content optimized second cache 130. In this figure, the first cache 120 storage medium has a block size of 10 KB, whereas the second cache 130 storage medium has a block size of 5 KB. It should be noted that the block sizes are presented for exemplary purposes and that the administrator can select other sizes that would be optimal for the specific mix of large sized and small sized traffic encountered by the caching servers under the administrator's control.

In this figure, the first cache 120 storage medium retrieves twice as much data/content with every read operation and stores twice as much data/content with every write operation than read or write operations performed by the second cache 130 storage medium. As a result, the first cache 120 is able to write large content with fewer write operations than the second cache 130. However, the second cache 130 storage medium has twice as many blocks as the first cache 120 storage medium, thereby allowing the second cache 130 storage medium to store more unique content than the first cache 120 storage medium when some of the content is 5 KB in size or smaller. Moreover, each individual read and write operation of the second cache 130 is performed faster than each individual read and write operation of the first cache 120 as a result of the second cache 130 reading and writing fewer bytes with each operation. For example, if both the first cache 120 and the second cache 130 are used to store a 5 KB file, the first cache 120 performs a full 10 KB write operation to store the 5 KB in a particular block and zero out the other bytes of the particular block, whereas the second cache 130 completes the write operation by writing only the 5 KB to one block.

Additional optimizations can involve implementing the large size content optimized first cache 120 on mechanical disk and implementing the small size content optimized second cache 130 on SSD. The mechanical disks have larger capacities than SSDs and comparable sequential read and write performance which allows for efficient reading and writing of large files. The smaller SSD capacity along with the very low seek latency of SSDs makes SSDs more efficient for high volume read and write accesses associated with small sized content.

As a result of these storage medium optimizations, the first cache 120 is better optimized for caching of large size content than the second cache 130. In summary, the larger block size of the first cache 120 allows the first cache 120 to retrieve and store large size content with fewer read and write operations than the second cache 130, thereby improving performance of the first cache 120 for large size content relative to the second cache 130. Similarly, the smaller block size of the second cache 130 allows the second cache 130 to store more small size content while also retrieving and storing with faster read and write operations than the first cache 120, thereby improving performance of the second cache 130 for small size content relative to the first cache 120.

The performance improvements resulting from the storage medium optimizations can be offset if the first cache receives small size content or requests for small size content and if the second cache receives large size content or requests for large size content. The role of the front-end distributor is to maintain optimal performance of the first and second caches by accurately differentiating incoming content and requests to ensure that content and requests for large size content pass to the large size content optimized first cache while content and requests for small size content pass to the small size content optimized second cache. To do so, the front-end distributor efficiently identifies the file size of requested or otherwise implicated content before selectively distributing large size content and large size content requests to the first cache and small size content and small size content requests to the second cache.

In some embodiments, the front-end distributor efficiently identifies file sizes of different requests or content by sending a head request to a source having the requested content available for redistribution. The source can be a caching server having a cached copy of the content or an origin server of the content provider providing the requested content. The front-end distributor can identify the source from a Uniform Request Locator (URL) included as part of a request that is to be distributed to one of the first or second caches.

In response to the head request, the front-end distributor receives a header of the requested content without the message body. From the returned header, the front-end distributor can determine the content size.

While accurately identifying the file size, the head request method introduces delay that can offset some of the performance gains resulting from the large and small size content optimizations to the different caches. The delay is due to the round-trip time needed to generate and send the head request as well as receive the head request response. Accordingly, some preferred embodiments utilize a different technique for efficiently identifying requested content sizes that does not impose the round-trip time associated with the head request.

In some embodiments, the front-end distributor efficiently identifies content sizes based on feature tracking. In some such embodiments, the front-end distributor uses one or more bloom filters or other data structures to track the features of prior requests received and distributed by the front-end distributor that resulted in the serving of large or small sized content. The front-end distributor uses the bloom filters and a set of hashing functions to determine if subsequently received requests specify the same features as previously received requests for large size content or for small sized content. The features can include parts of or entire URLs identifying the content being requested as well as port numbers, protocols, addressing, user agent, and other header fields that could be used to differentiate large size content requests from small size content requests.

As described in further detail with reference to FIG. 3, the bloom filters track different features for large or small size content by setting one or more unique sets of bit indices in the bloom filters. As the number of tracked features grows, the number of bit indices that are set within the bloom filters grows, which, in turn, increases the chance of a false positive incorrectly differentiating large size content as small size content or vice versa. Some embodiments reduce the potential for false positives by controlling the size of the bloom filters, rolling the bloom filters, and periodically resetting the bloom filters.

The size of the bloom filters is set relative to the number of unique content or different items tracked or expected to be requested or cached in a corresponding optimized cache. For example, if the large size content optimized cache is expected to cache or receive requests for two billion unique objects, then the bloom filter tracking request features for those objects should be approximately two gigabytes in size.

Bloom filter state rolling combined with periodic resets can be used to prevent the bloom filters from filling up by removing bit indices that have been set for stale or obsolete content. State rolling involves tracking requests to a first bloom filter during one interval. Once the interval ends, the first bloom filter state is retained as the previous state. The previous state of the first bloom filter can be copied to a second bloom filter and the first bloom filter can be reset to track requests during a new current interval. Alternatively, the first bloom filter can be retained to track the previous state and the second bloom filter can be reset and used to track requests during the new current interval, wherein the first and second bloom filters swap between tracking the current state to the previous state at the end of each interval. The previous state is then used in conjunction with the new current state to remove bit indices for stale or expired content without affecting bit indices for actively requested content. In particular, a request for particular content arriving during the current interval is first checked against the current interval bloom filter. If the indexed bits are not set in the current interval bloom filter, then the particular content request is the first such request arriving during the current interval and the bits are set. However, the indexed bits are also checked against the previous state bloom filter to see if the particular content was previously requested. If so, the request can be correctly differentiated and routed based on the previous state bloom filter. Content that is not requested at least once during each current interval will not be tracked, thereby allowing the bloom filters to unset the bits indexed by the stale or expired content.

The interval for rolling the bloom filter state and resetting one of the bloom filter should be larger than the age of the last file accessed in cache. Some embodiments find the age of the last file accessed in cache by implementing a least recently used queue for accessed items. The last item in the queue represents the oldest item. Accordingly, the age for the last item in the queue is used to set the state rolling and reset interval. For example, if the oldest file age in cache is fourteen days, then the bloom filter state would be rolled every fourteen days.

Figure 3:
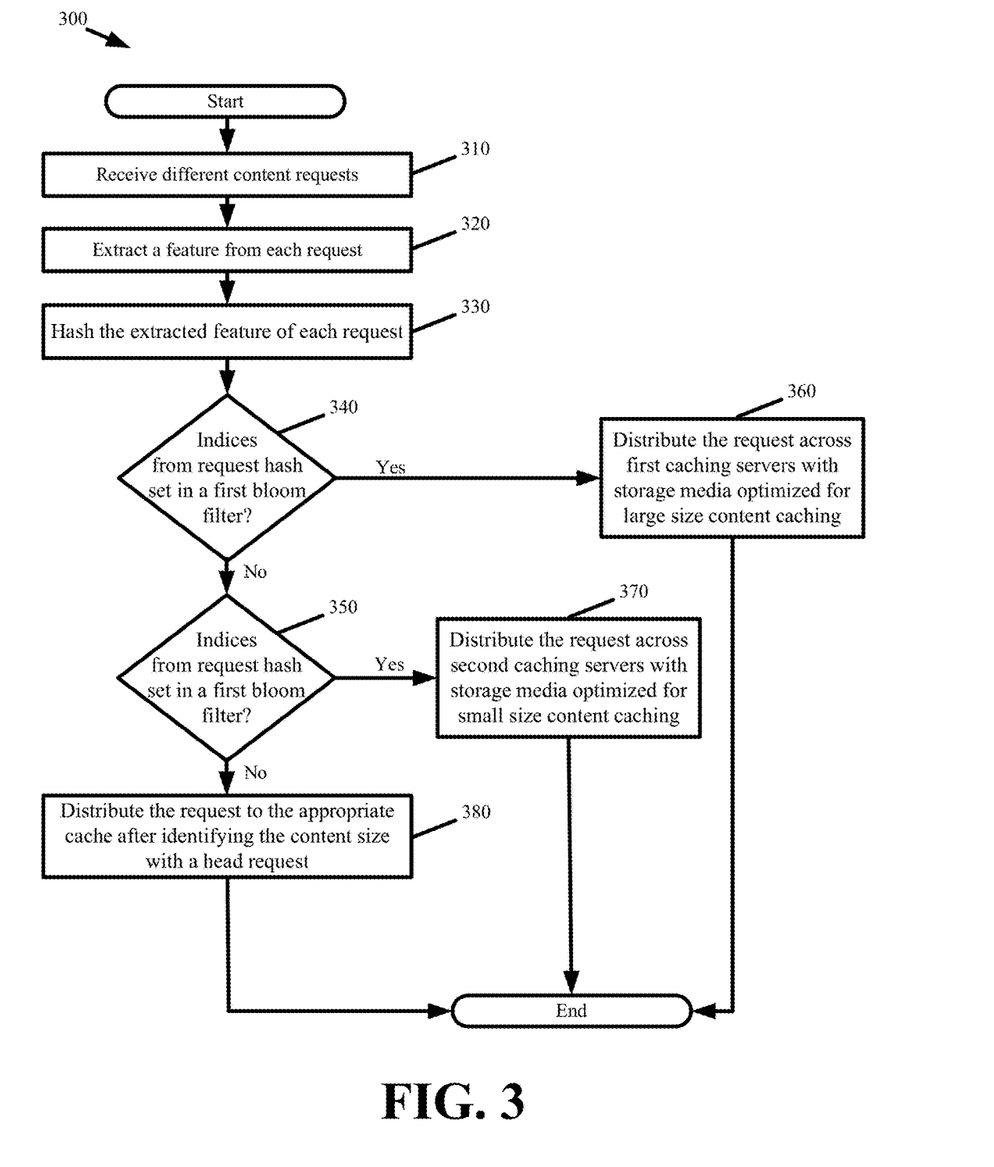
FIG. 3 presents a feature tracking process performed by the front-end distributor in accordance with some embodiments.

FIG. 3 presents a feature tracking process 300 performed by the front-end distributor in accordance with some embodiments. The process 300 commences with the front-end distributor receiving (at 310) a plurality of requests. The process extracts (at 320) at least one feature for each request. The at least one feature will typically include a URL or part of a URL identifying the content being requested. The at least one feature could also include port numbers, protocols, addressing, user agent, and other header fields that could be used to differentiate large size content requests from small size content requests.

The process uses one or more hashing functions to hash (at 330) the at least one feature that is extracted from each request. The hashing of the at least one feature extracted from a particular request indexes one or more bits of the first bloom filter tracking large size content and one or more bits of the second bloom filter tracking small size content. The hashing of different features from different requests will index different sets of bits of the bloom filters.

The process determines (at 340) whether the one or more bits indexed in the first bloom filter as a result of the hashing are set. When the one or more bits indexed in the first bloom filter are set, the process distributes (at 360) the request across one or more first caching servers with storage media optimized for large size content caching (i.e., the first cache). The front-end distributor may use a first distribution request scheme to distribute large size content requests across the large size content optimized caching servers.

When the one or more bits indexed in the first bloom filter as a result of the hashing are not set, the process determines (at 350) whether the one or more bits indexed in the second bloom filter as a result of the hashing are set. When the one or more bits indexed in the second bloom filter as a result of the hashing are set, the process distributes (at 370) the request across one or more second caching servers with storage media optimized for small size content caching (i.e., the second cache). The front-end distributor may use a different second distribution request scheme to distribute small size content requests across the small size content optimized caching servers.

When the one or more bits indexed in the second bloom filter as a result of the hashing are not set, the front-end distributor identifies the request as a first received request for particular content that has not yet been tracked and classified. In such cases, the process can distribute (at 380) the request to the appropriate cache after identifying the content size with a head request. Contemporaneous with the distribution, the process can also set the one or more bits indexed in the first bloom filter as a result of the hashing if the head request identifies large size content or set the one or more bits indexed in the second bloom filter as a result of the hashing if the head request identifies small size content.

Figure 4:
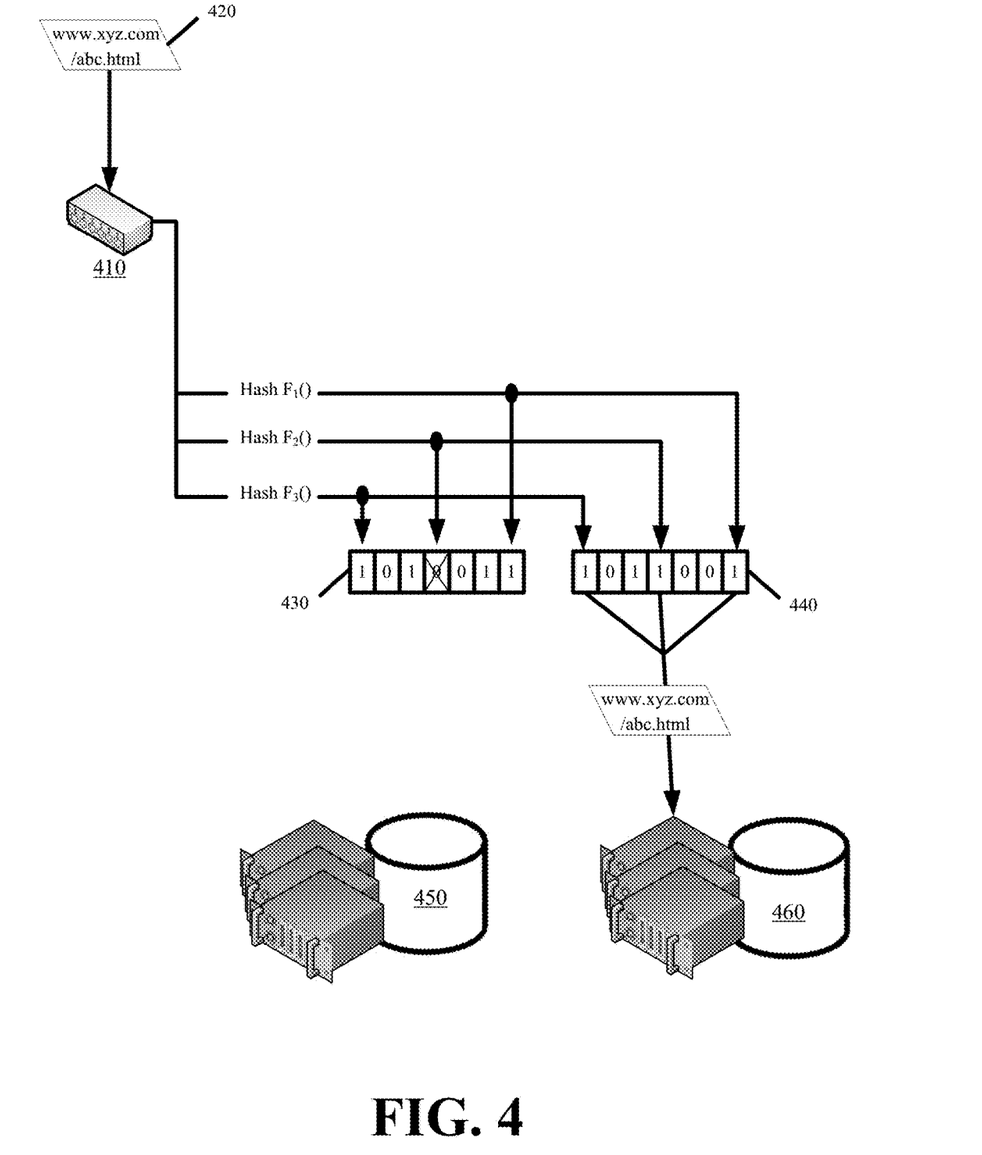
FIG. 4 conceptually illustrates differentiating a request according to the feature tracking of some embodiments.

FIG. 4 conceptually illustrates differentiating a request according to the feature tracking of some embodiments. The figure illustrates the front-end distributor 410, a request 420, a first bloom filter 430 tracking features of previously received large size content, a second bloom filter 440 tracking features of previously received small size content, a first cache 450 optimized for large size content, and a second cache 460 optimized for small size content.

The front-end distributor 410 receives and hashes the request 420 using a set of hashing functions. In this figure, the front-end distributor 410 hashes the entire request 420 URL. However in some other embodiments, the front-end distributor 410 hashes different segments or part of the URL in combination with or independent of different header fields of the request 420.

The hash result of the request 420 URL indexes a set of bits that are not all set in the first bloom filter 430. Accordingly, from this simple and efficient hash, the front-end distributor 410 identifies that the request 420 is not directed to a feature of previously encountered large size content.

The hash result does however index a set of bits that are all set in the second bloom filter 440. The front-end distributor 410 therefore identifies the request 420 as being directed to small size content and therefore distributes the request across the small size content optimized second cache 460.

In some embodiments, the front-end distributor efficiently identifies content sizes based on a configurable feature list and feature matching. An administrator or content provider specifies features of large sized content and/or features of small sized content. Upon receiving a request, the front-end distributor performs feature matching in order to determine if features from the request match more closely to the configured large size content features or to the configured small size content features. For instance, the front-end distributor may be configured with a feature list that includes "video" or "stream" as features of large sized content. Based on this feature list, the front-end distributor identifies request URLs containing the terms "video" or "stream" as being directed to large size content and sends those requests to the large size content optimized first cache. In some embodiments, the front-end distributor performs score based feature matching or first match feature matching in differentiating the requests based on the configured feature lists. The front-end distributor can perform feature matching in combination with or independent of the feature tracking.

Figure 5:
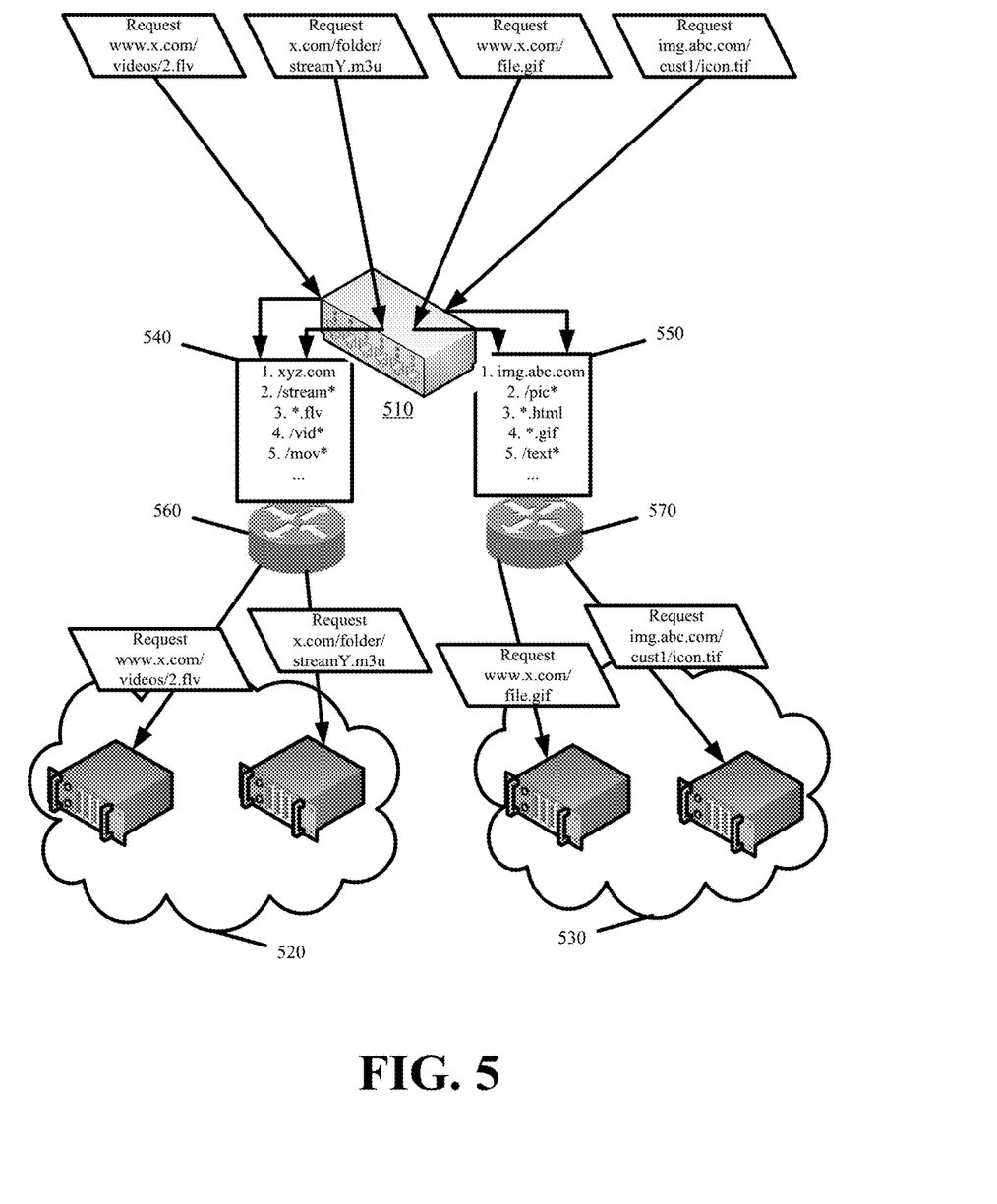
FIG. 5 conceptually illustrates a front-end distributor selectively distributing requests based on predictive models that differentiate the requests on the basis of large size content and small size content in accordance with some embodiments.

FIG. 5 conceptually illustrates a front-end distributor 510 selectively distributing requests according to the feature matching of some embodiments. The figure involves the front-end distributor 510, a first set of caching servers optimized for large size content 520, and a second set of caching server optimized for small size content 530.

The front-end distributor 510 is configured with a first feature list 540 for identifying large size content and a second feature list 550 for identifying small size content. Each of the feature lists 540 and 550 is configured by an administrator or content provider whose content is served by the cache optimized caching servers. The feature lists 540 and 550 are defined using one or more request features. As noted above, the features can include URL domains, paths names, and file names as well as various request header fields. The front-end distributor 510 is also configured with a first request distribution scheme 560 for distributing large size content requests across the first set of caching servers 520 and a different second request distribution scheme 570 for distributing small size content requests across the second set of caching servers 530.

For every request the front-end distributor 510 receives over a digital network, such as the Internet, the front-end distributor 510 extracts one or more features from the request. Here again, the extracted features can include different URL parts, port numbers, protocols, addressing, user agent, and other header fields.

As a result of the request features matching one or more features from the large size content feature list 540, the front-end distributor 510 identifies the request as one for large size content. In such cases, the front-end distributor 510 uses the first request distribution scheme 560 to select a caching server from the first set of caching servers 520 to receive the large size content request. The front-end distributor 510 then distributes the request to the selected caching server so that the selected server can respond to the request with the requested large size content using its large size content optimized configuration.

As a result of the request features matching one or more features from the small size content feature list 550, the front-end distributor 510 identifies the request as one for small size content. In such cases, the front-end distributor 510 uses the second request distribution scheme 570 to select a caching server from the second set of caching servers 530 to receive the small size content request. The front-end distributor 510 then distributes the request to the selected caching server so that the selected server can respond to the request with the requested small size content using its small size content optimized configuration.

In some embodiments, distribution according to the first request distribution scheme 560 involves hashing request URLs or other identifiers from the request header in order to select a caching server from the respective pool of the first set of caching servers 520. Distribution according to the second request distribution scheme 570 can also involve hashing request URLs or other identifiers from the request header as part of its selection of a caching server from the respective pool of the second set of caching servers 530. In some embodiments, the first request distribution scheme 560 provides a persistent request distribution across the first set of caching servers 520 and the second request distribution scheme 570 provides a persistent request distribution across the second set of caching servers 530. In particular, each of the first and second request distribution schemes 560 and 570 takes the request URL as input, hashes the request URL, and uses the hash result to identify a particular server that is tasked with responding to all requests for the same content. In other words, the first request distribution scheme 560 selects a same first server from the first set of caching servers 520 to receive requests for first large size content and a same second server from the first set of caching servers 520 to receive requests for different second large size content. In some such embodiments, the first request distribution scheme 560 can be a first implementation of the Cache Array Routing Protocol (CARP) across a first domain defined by the large size content predictive models 540 and the second request distribution scheme 570 can be a second implementation of CARP across a second domain defined by the small size content predictive models 550.

Some embodiments perform the feature matching according to a score based implementation. Each feature in the different feature lists is provided a score. The score identifies the relative importance of the feature in differentiating a request. In particular, features with a higher likelihood of being included as part of a large size content request are assigned higher scores than features with a lower likelihood of bring included as part of a large size content request. The front-end distributor then sums the scores for request features that match the large size content feature list separately from the scores for request features that match the small size content feature list. The greater value determines how the front-end distributor classifies the request.

Figure 6:
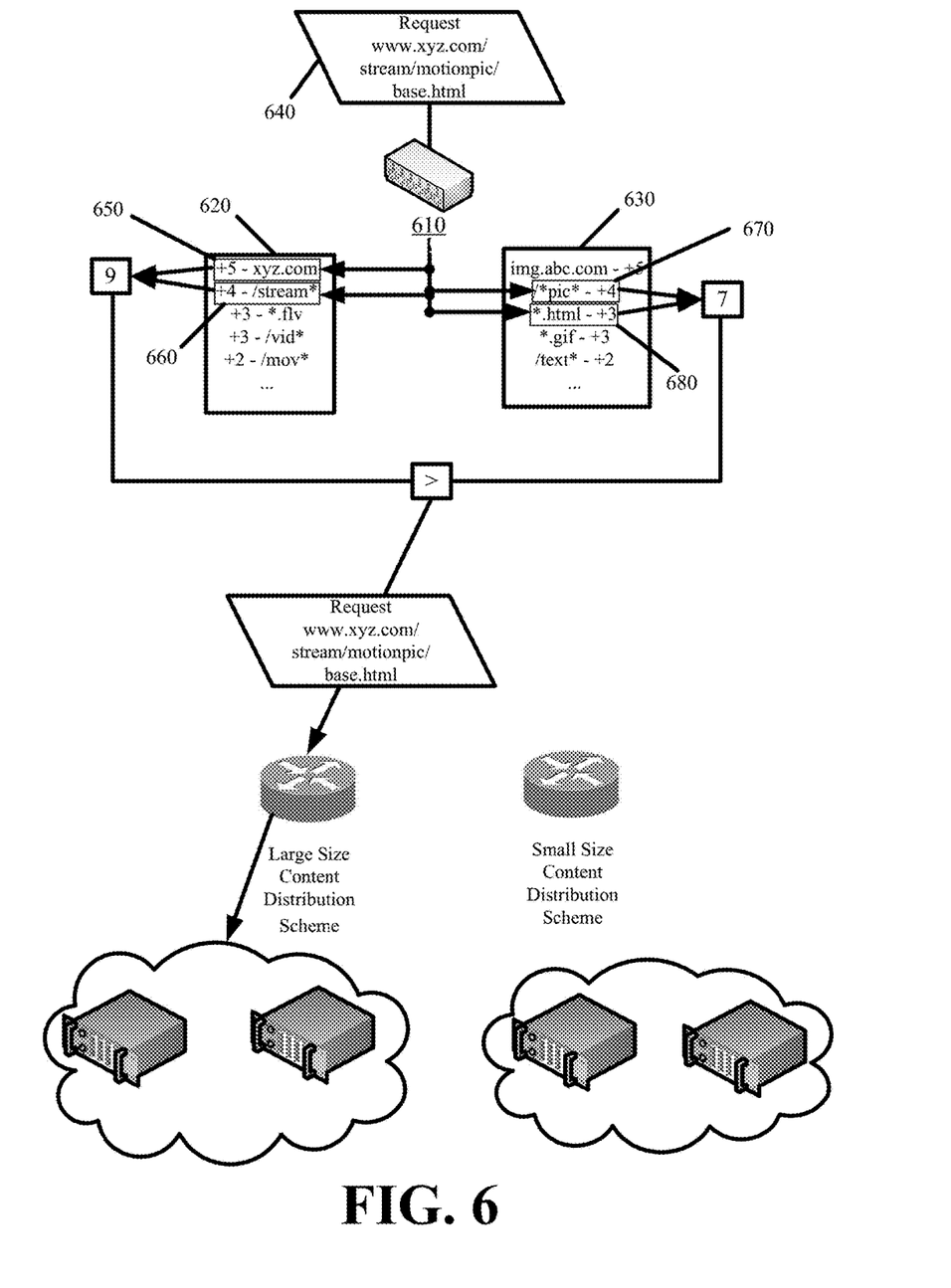
FIG. 6 conceptually illustrates score based feature mapping in accordance with some embodiments.

FIG. 6 conceptually illustrates score based feature mapping in accordance with some embodiments. The figure involves a front-end distributor 610 that is configured with a large size content feature list 620 and a small size content feature list 630. Each feature list 620 and 630 further identifies scores that have been assigned to the different features.

The front-end distributor 610 receives a request 640 with a URL having features that are found in both the feature lists 620 and 630. As shown, the request 640 URL includes features 650 and 660 that are present in the large size content feature list 620. Accordingly, the front-end distributor 610 computes a first large size content score based on the scores associated with features 650 and 660. The request 640 URL also includes features 670 and 680 that are present in the small size content feature list 630. The front-end distributor 610 computes a second small size content score based on the scores associated with the features 670 and 680. The front-end distributor 610 identifies that the first large size content score is greater than the second small size content score. Accordingly, the front-end distributor 610 distributes the request 620 across the set of servers that are optimized for large size content.

Some embodiments perform the feature matching according to a first match implementation. In some such embodiments, the front-end distributor differentiates a request based on the first match ranking or most important feature matching from each of the feature lists.

The configurable nature of the feature lists allows for administrators and content providers control over how to use the different optimized caches. Feature list reconfigurations can be used to balance load across the different caching servers or caches as well as improve feature list accuracy. For example, the large size content optimized caching servers can be overloaded at a particular point in time. The feature lists can be reconfigured to shift some percentage of the requests and corresponding content onto the small size content optimized caching servers until the load is sufficiently reduces or the demand decreases.

It should be noted that the feature list reconfiguration, especially in the above scenario, can lead to an increase in cache misses or cache pollution (where the same content is stored in multiple caches). A change management system (CMS) can be used to mitigate against harm resulting from feature list reconfiguration. Administrators and content providers may add, remove, or otherwise modify the feature lists using the CMS. However before any change is entered, the CMS may require secondary approval (by another administrator) or change analysis.

Change analysis involves computing a penalty that may occur in response to entering a feature list change. If the penalty is within a threshold, the change may be automatically entered or may be moved for secondary approval.

The penalty can be computed either by estimating the cache misses or cache pollution that is likely to occur as a result of the feature list change. In particular, the penalty estimates the cache miss count or cache pollution bytes over time if a feature list entry was edited or reconfigured.

Figure 7:
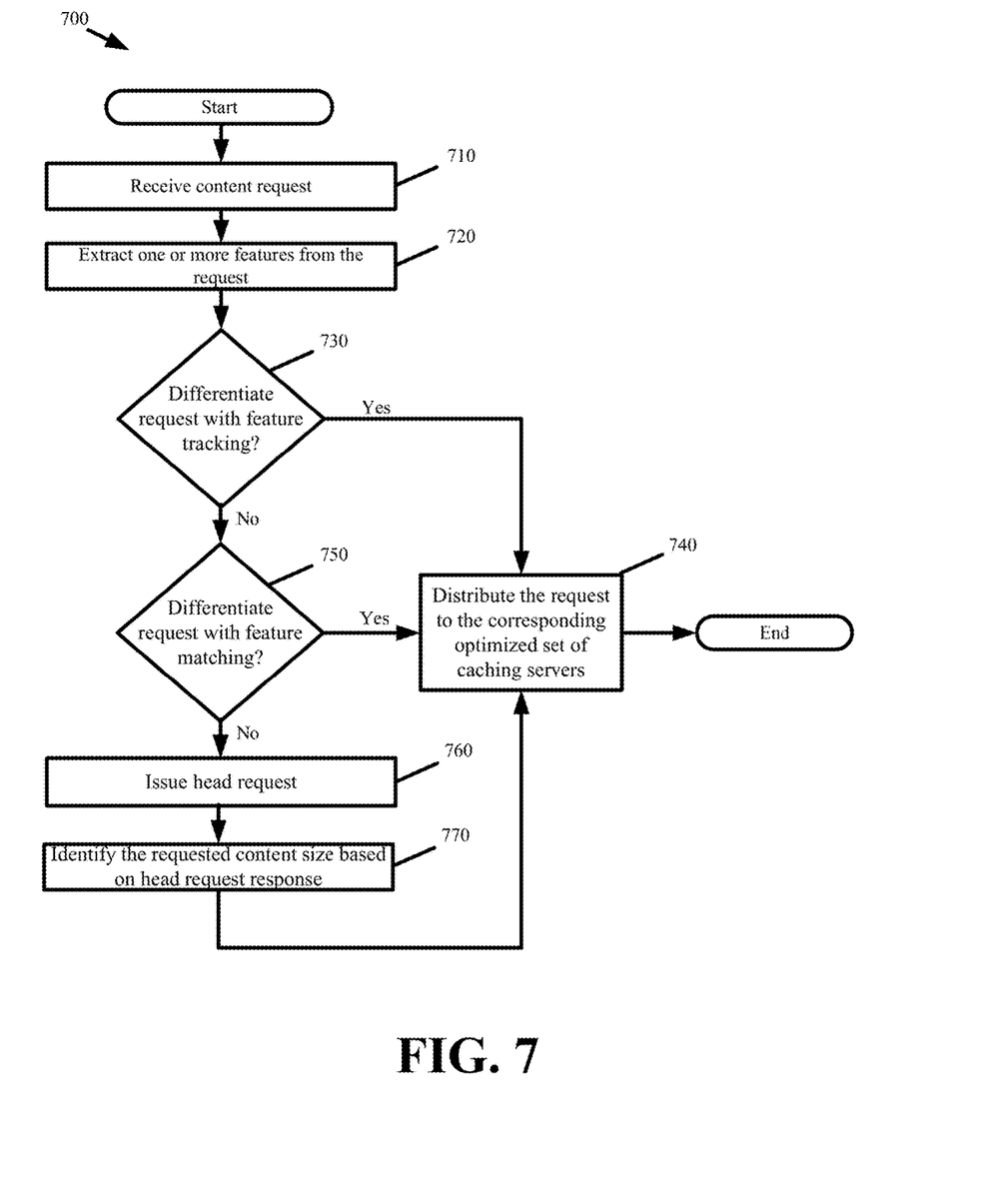
FIG. 7 presents a process for differentiating requests in accordance with some embodiments based on a combination of the head request, feature tracking, and feature matching.

In some embodiments, the front-end distributor performs a combination of the head request, feature tracking, and feature matching in order to efficiently identify and differentiate requests as large size content requests or as small size content requests. FIG. 7 presents a process 700 for differentiating requests in accordance with some embodiments based on a combination of the head request, feature tracking, and feature matching.

The process 700 commences with the front-end distributor receiving (at 710) a request for distribution across either a large size optimized cache or a small size optimized cache. The process extracts (at 720) one or more features from the request.

The process first attempts to differentiate (at 730) the request with feature tracking as per FIG. 3 above. Accordingly, the front-end distributor hashes the extracted request features to determine if the hash results indexes bits that have been set in either the first bloom filter tracking previously received large size content requests or the second bloom filter tracking previously received small size content requests.

If request differentiation through feature tracking is successful, the process distributes (at 740) the request to the corresponding optimized set of caching servers. Otherwise, the process next attempts to differentiate (at 750) the request with feature matching as per FIG. 5 above.

If request differentiation through feature matching is successful, the process distributes (at 740) the request to the corresponding optimized set of caching servers. Otherwise, the process issues (at 760) a head request. Upon receiving the head request response, the process accurately identifies (at 770) the requested content size and distributes (at 740) the request to the corresponding optimized set of caching servers.

To avoid the delay associated with the head request, some embodiments select a random or default caching server to receive the request. Such random or default selection however can create extra cache writes and cache pollution.

To minimize the extra cache writes and cache pollution, the front-end distributor can select a caching server randomly or with a default selection and contemporaneously issue the head request. The distribution of an initial request for particular content will result in a cache miss, but by the time a subsequent request for the particular content arrives for the same content, the head request response may have been received allowing the front-end distributor to correctly differentiate and route the request on the second request.

The random or default server selection may also be used for distributing an initial request for chunk encoded content. The front-end distributor then determines the correct bloom filter to track the chunk encoded content. In some embodiments, the front-end distributor uses a counter to measure the size of the chunk encoded content before determining which bloom filter to use to track the content. Subsequent requests for the chunk encoded content can then be correctly distributed.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
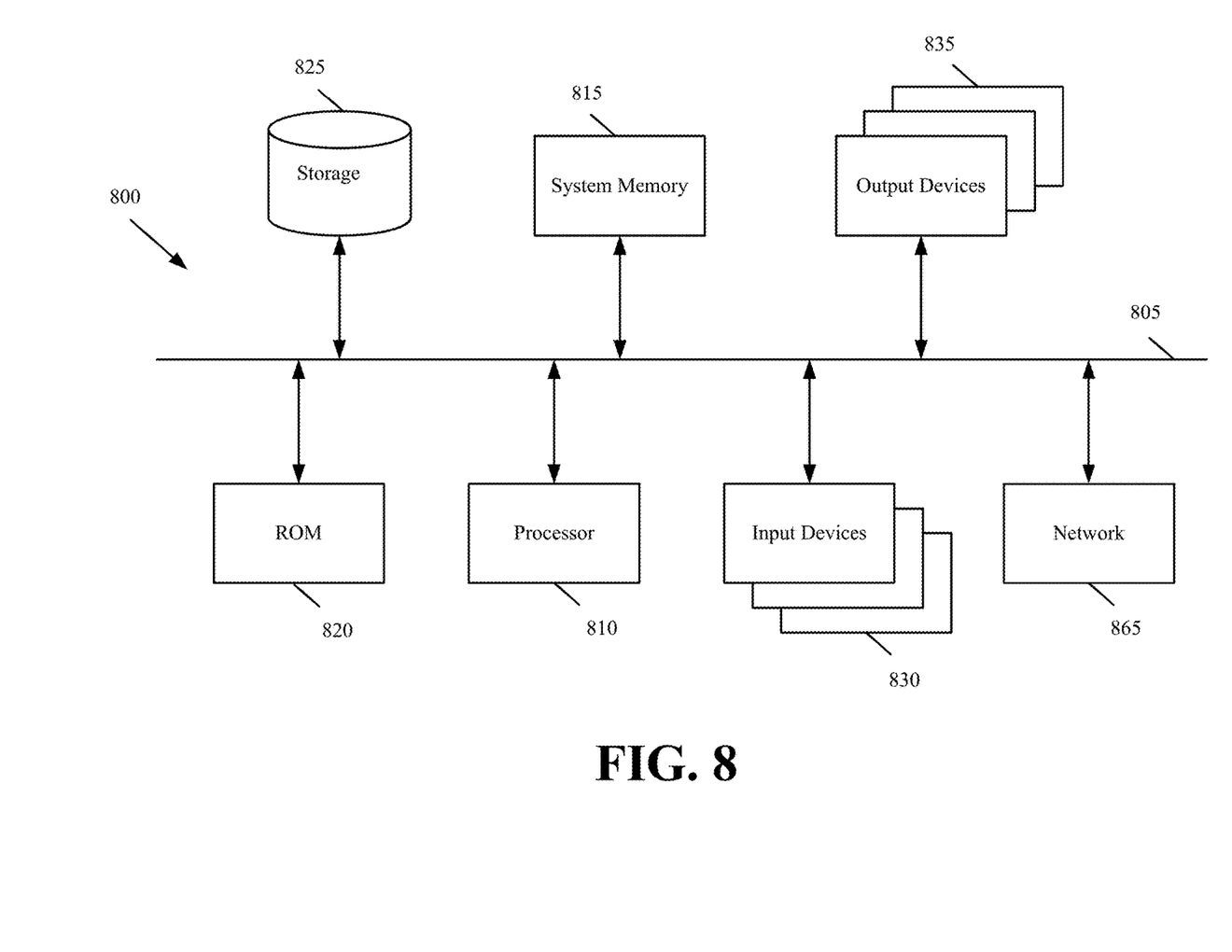
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., front-end distribution server, large size content optimized caching server, or small size content optimized caching server). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments use a mass-storage device (such as a magnetic, solid-state, or optical disk) as the permanent storage device 825.

Other embodiments use a removable storage device (such as a flash drive) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   tracking at a request distributor, features from a first set of Uniform Resource Locators (URLs) of different large size content to different sets of indices of a first bloom filter, and different features from a second set of URLs of different small size content to different sets of indices of a second bloom filter, wherein a feature of a particular URL is a segment from a plurality of segments forming the particular URL;
   receiving a plurality of requests at the request distributor, the plurality of requests comprising a third set of URLs differing from each URL of the first set of URLs and each URL of the second set of URLs;
   identifying at the request director,
      (i) a first subset of the third set of URLs, from a first subset of the plurality of requests, targeting large size content based on features from each URL of the first subset of URLs indexing one or more indices set in the first bloom filter,
      (ii) a second subset of the third set of URLs, from a second subset of the plurality of requests, targeting small size content based on features from each URL of the second subset of URLs indexing one or more indices set in the second bloom filter, and
      (iii) a third subset of the third set of URLs, from a third subset of the plurality of requests, comprising features that index one or more indices not set in the first bloom filter or the second bloom filter;
   retrieving a header without a content body for each request of the third subset of requests that cannot be identified as targeting large size content or small size content using indices of the first bloom filter and the second bloom filter;
   distributing from the request distributor to a first cache according to a first request distribution scheme, the first subset of requests in response to said identifying, via the first bloom filter, the first subset of URLs targeting large size content, and one or more requests from the third subset of requests in response to the headers retrieved for the one or more requests comprising an identifier targeting large size content;

distributing from the request distributor to a different second cache according to a second request distribution scheme, the second subset of requests in response to said identifying, via the second bloom filter, the second subset of URLs targeting small size content, and one or more other requests from the third subset of requests in response to the headers retrieved for the one or more other requests comprising an identifier targeting small size content;

caching large size content requested by the first subset of requests and the one or more requests of the third subset of requests within the first cache using a first block size in response to said distributing; and caching small size content requested by the second subset of requests and the one or more other requests of the third subset of requests within the second cache using a second block size that is smaller than the first block size in response to said distributing.

2. The method of claim 1 further comprising extracting at least one feature from each request of the plurality of requests, wherein the feature comprises at least one of a Uniform Resource Locator (URL) domain name, URL path, file name, file extension, or parameter from a request header field.

3. The method of claim 2, wherein said identifying comprises matching the at least one feature from each URL of the first subset of URLs to a first feature list of different large size content, and matching the at least one feature from each URL of the second subset of URLs to a second feature list of different small size content.

4. The method of claim 1, wherein the first cache is formed from a first set of caching servers each with at least one physical storage device configured with a first block size with which content is read from and written to the at least one physical storage device, and the second cache is formed from a second set of caching servers that are different than the first set of caching servers, and wherein each of the second set of caching servers comprises at least one different physical storage device configured with a different second block size with which content is read from and written to the at least one different physical storage device, the method further comprising selecting a caching server from the first set of servers to receive a request from the first subset of requests using said first request distribution scheme and selecting a caching server from the second set of servers to receive a request from the second subset of requests using said second request distribution scheme, wherein the first request distribution scheme limits request distribution to the first set of servers and the second request distribution scheme limits request distribution to the second set of servers.

5. The method of claim 1, wherein caching the large size content comprises writing the large size content to a plurality of blocks of the first block size, and wherein caching the small size content comprises writing the small size content to a plurality of blocks of the second block size, wherein each block of the first block size stores more data than each block of the second block size.

6. The method of claim 5 further comprising responding to a request from the first subset of requests by reading large size content from a plurality of blocks of the first block size and sending the large size content from the first cache to a requestor.

7. The method of claim 1, wherein caching the large size content within the first cache comprises writing the large size content to a plurality of blocks in the first cache of the first block size, and wherein said caching of the large size content using the first block size is performed with fewer write operations than caching the large size content to the second cache using the second block size.

8. A method comprising:
tracking a first subset of segments from different parts of a first set of Uniform Request Locators (URLs) of a first set of requests to different sets of indices in a first array, and a different second subset of segments from different parts of a different second set of URLs of the first set of requests to different sets of indices in a different second array;

storing a first feature list and a second feature list, the first feature list comprising URL features associated with a first type of content, and the second feature list comprising URL features associated with a different second type of content;

receiving a second set of requests, each request of the second set of requests comprising a URL different than URLs of the first and second sets of URLs;

routing (i) a first request of the second set of requests to a server from a first set of servers forming a first cache in response to the first request comprising a first request URL with at least one segment hashing to one or more indices set in the first array and (ii) a second request of the second set of requests to a server from a different second set of servers forming a different second cache in response to the second request comprising a second request URL with at least one segment hashing to one or more indices set in the second array;

determining a third request of the second set of requests comprises a third request URL with segments that hash to one or more indices that are not set in the first array or the second array;

routing the third request (i) to a server from the first set of servers in response to one or more segments of the third request URL matching to one or more features in the first feature list, and (ii) to a server from the second set of servers in response to one or more segments of the third request URL matching to one or more features in the second feature list,
wherein said routing the first request, the second request, and the third request is performed without obtaining a size of content or inspecting content requested in either the first request the second request, or the third request.

9. The method of claim 8, wherein said routing further comprises selecting a first request distribution scheme in response to the first request, the first request distribution scheme restricting distribution of the first request to the server from the first set of caching servers forming the first cache.

10. The method of claim 9, wherein said routing further comprises selecting a different second distribution scheme in response to the second request, the second distribution scheme restricting distribution of the second request to the server from the different second set of caching servers forming the second cache.

11. The method of claim 8 further comprising caching in response to the first request, large size content to a first plurality of blocks of a first block size in said first cache and caching in response to the second request, small size content to a second plurality of blocks of a second block size in said second cache, wherein each block of the first plurality of blocks stores more data than each block of the second plurality of blocks.

12. The method of claim 8 further comprising serving in response to the first request, large size content from a first plurality of blocks of a first block size from said first cache and serving in response to the second request, small size content from a second plurality of blocks of a second block size in said second cache, wherein each block of the first plurality of blocks is read slower than each block of the second plurality of blocks.

13. A method comprising:
providing a first cache and a second cache on different caching servers, the first cache comprising at least a first caching server with a microprocessor and a storage medium subdivided into a first plurality of blocks of a first block size, and the second cache comprising at least a different second caching server with a microprocessor and a storage medium subdivided into a second plurality of blocks of a second block size that is smaller than the first block size;
receiving a first request with a first URL directed to first content, and a different second request with a different second URL directed to second content;
determining that the first URL and the second URL comprise segments that index one or more indices not set in a first bloom filter or a second bloom filter, the first bloom filter tracking segments from a first set of URLs of different large size content, and the second bloom filter tracking segments from a second set of URLs of different small size content;
producing, in response to said determining, a first score for each of the first request and the second request based on a first number of segments from the first URL and the second URL matching segments in a first feature list associated with large size content, wherein the segments comprise one or more of a domain name, path, filename, or file extension;
producing, in response to said determining, a second score for each of the first request and the second request based on a second number of segments from the first URL and the second URL matching segments in a different second feature list associated with small size content;
routing the first request to the first cache in response to the first score of the first request being greater than the second score of the first request based on the segments of the first URL matching more segments in the first feature list than segments in the second feature list;
caching said first content to the first cache in response to said routing of the first request, wherein caching the first content comprises writing first content data to a first number of the first plurality of blocks, wherein the first number is equal to the size of the first content divided by the first block size;
routing the second request to the second cache in response to the first score of the first request being greater than the second score of the first request based on the segments of the second URL matching more segments in the second feature list than segments in the first feature list;
caching said second content to the second cache in response to said routing of the second request, wherein caching the second content comprises writing second content data to a second number of the second plurality of blocks, wherein the second number is equal to the size of the second content divided by the second block size.

14. The method of claim 13, wherein caching the first content to the first cache is performed with fewer write operations than caching the first content to the second cache as a result of the first block size of the first cache being larger than the second block size of the second cache.

15. The method of claim 14 further comprising retrieving the second content from the second cache by reading the second content data from the second number of the second plurality of blocks, wherein retrieving the second content from the second cache is performed faster than retrieving the second content from the first cache as a result of the second block size of the second cache being smaller than the first block size of the first cache.

16. The method of claim 13, wherein the first cache storage medium and the second cache storage medium comprises different magnetic, solid state, optical, or holographic disk.

17. The method of claim 13, wherein the first block size is at least twice the number of kilobytes as the second block size.

* * * * *